US008886989B2

(12) United States Patent
Ogawa et al.

(10) Patent No.: US 8,886,989 B2
(45) Date of Patent: Nov. 11, 2014

(54) MEMORY DEVICE

(75) Inventors: Masaru Ogawa, Kawasaki (JP); Tarou Iwashiro, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 896 days.

(21) Appl. No.: 13/021,243

(22) Filed: Feb. 4, 2011

(65) Prior Publication Data
US 2011/0296235 A1    Dec. 1, 2011

(30) Foreign Application Priority Data

May 27, 2010 (JP) .................... 2010-121959

(51) Int. Cl.
*G06F 11/00* (2006.01)
*G06F 12/02* (2006.01)
*G06F 11/10* (2006.01)

(52) U.S. Cl.
CPC .... *G06F 11/1048* (2013.01); *G06F 2212/7209* (2013.01); *G06F 12/0246* (2013.01)
USPC ....................................... 714/6.11

(58) Field of Classification Search
CPC ... G06F 12/00; G06F 12/0246; G06F 3/0679; G06F 11/1048; G06F 11/1068; G06F 11/004
USPC ....................................... 714/6.11
See application file for complete search history.

(56) References Cited

U.S. PATENT DOCUMENTS

2010/0023840 A1* 1/2010 Nakao et al. .................. 714/763
2011/0099323 A1* 4/2011 Syu .............................. 711/103

FOREIGN PATENT DOCUMENTS

JP    2009-536424    10/2009

* cited by examiner

*Primary Examiner* — Jigar Patel
(74) *Attorney, Agent, or Firm* — Oblon, Spivak, McClelland, Maier & Neustadt, L.L.P.

(57) ABSTRACT

According to one embodiment, a memory device includes a semiconductor memory and a controller that controls the semiconductor memory. The controller includes a first command issuing module, second command issuing module, error correction module and control module. The first command issuing module is configured to issue a read command to the semiconductor memory. The second command issuing module is configured to issue a first command instructing a process that does not involve reading data from the semiconductor memory independently from the first command issuing module to the semiconductor memory. The error correction module is configured to correct an error contained in data supplied from the semiconductor memory. The control module is configured to control the error correction module, first command issuing module and second command issuing module.

15 Claims, 8 Drawing Sheets

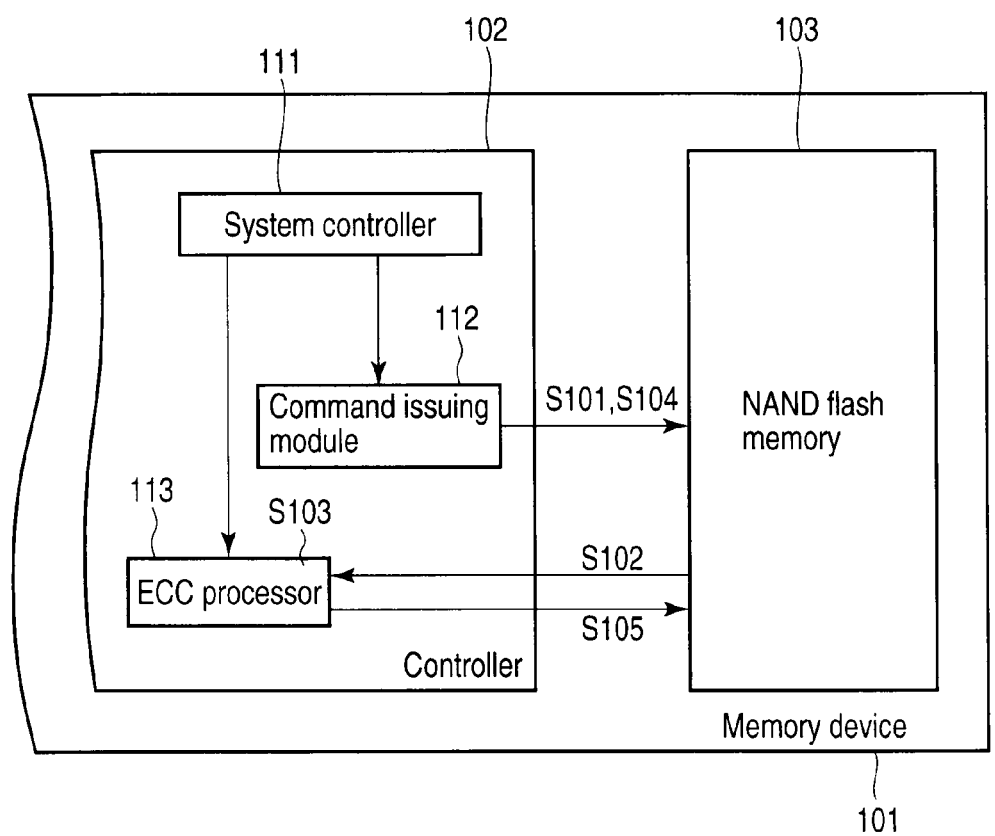
F I G. 1

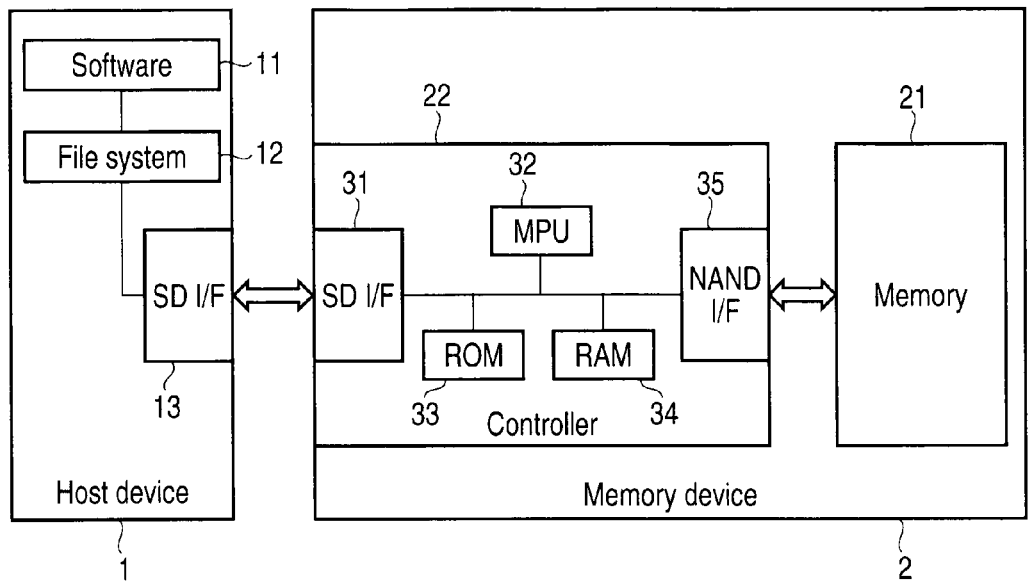
F I G. 3
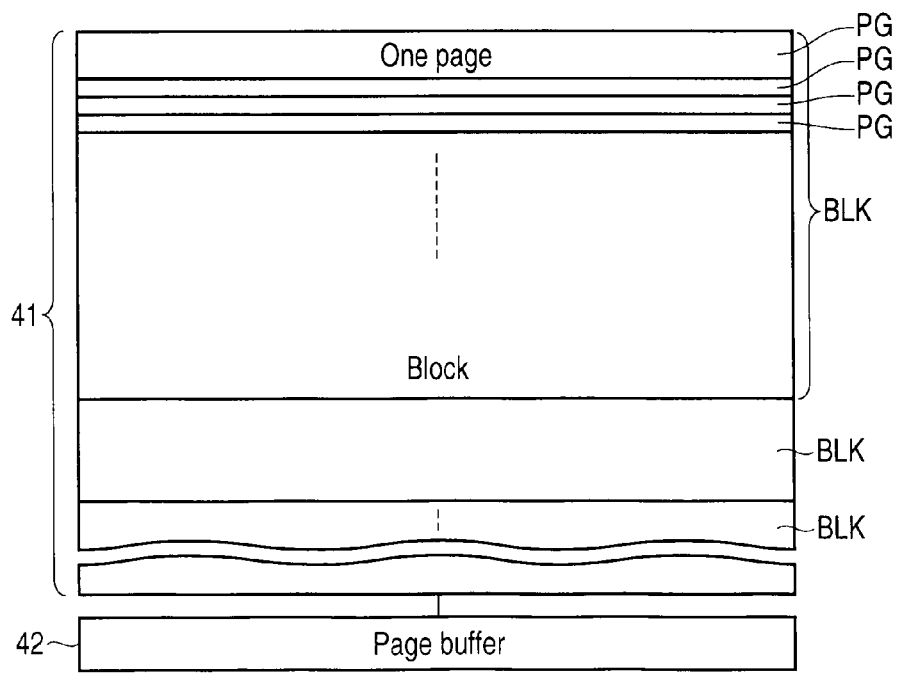
F I G. 4

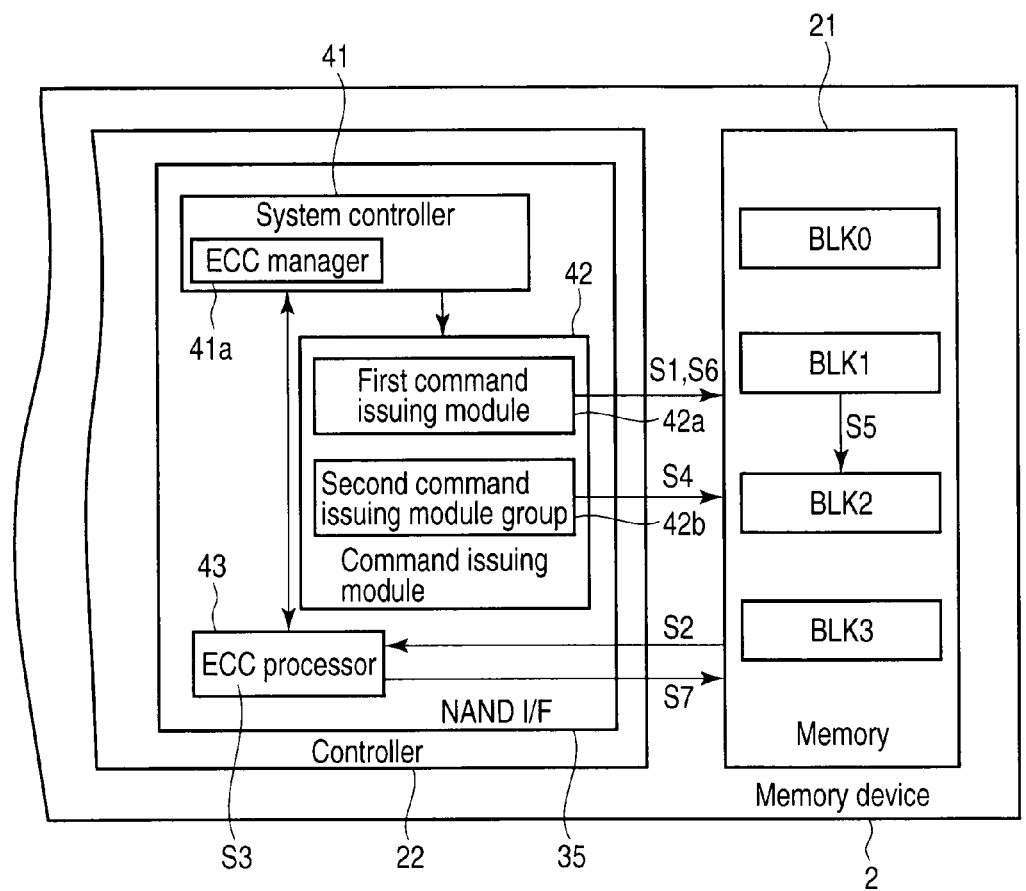
F I G. 6

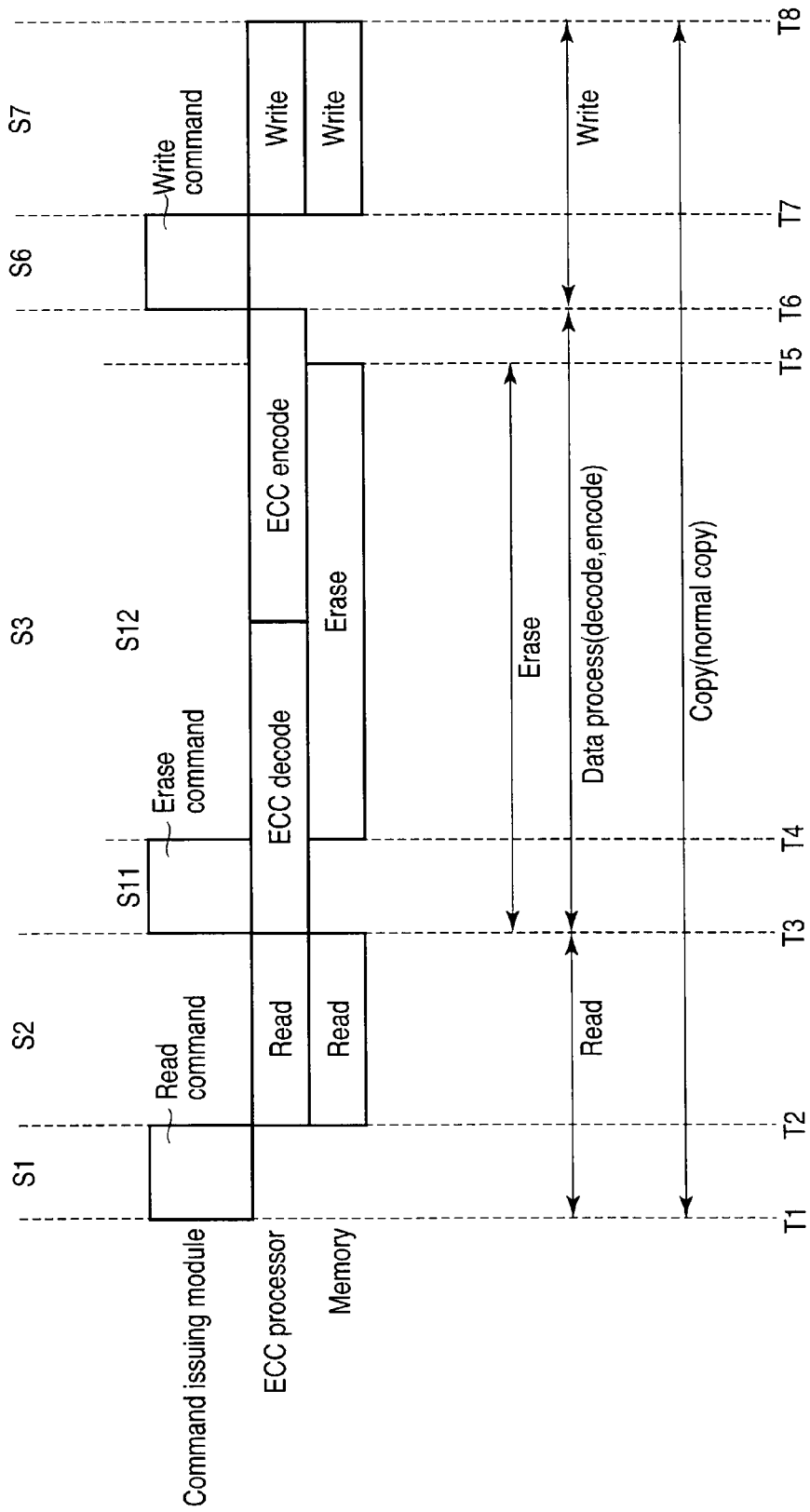
F I G. 8

MEMORY DEVICE

CROSS-REFERENCE TO RELATED APPLICATIONS

This application is based upon and claims the benefit of priority from Japanese Patent Application No. 2010-121959, filed May 27, 2010; the entire contents of which are incorporated herein by reference.

FIELD

Embodiments described herein relate generally to a memory device.

BACKGROUND

At present, memory devices using nonvolatile semiconductor memories such as flash memories are used as recording media for music data and image data. Such a memory device often contains a controller for controlling the memory. The controller serves as an interface between a file system of a host into which the above memory device is inserted and the semiconductor memory, for example. One of its objects is to translate a request from the file system of the host in accordance with the characteristic of the semiconductor memory, for example.

As a typical example of the flash memory used in the memory device, a NAND flash memory is given. Data cannot be overwritten in the NAND flash memory. Therefore, when the memory device receives a request of overwriting from the file system, the controller issues an instruction corresponding to the characteristic of the NAND flash memory to the NAND flash memory to indirectly execute the request of overwriting on the memory device side.

The memory device is required to have larger storage capacity and a high-speed operation. In order to realize the larger storage capacity of the memory device, the storage capacity of the flash memory is increased. As means for realizing the large storage capacity of the flash memory, miniaturization of the area of each cell of the flash memory, use of multiple bits for information stored in one cell and the like are known. However, the technique for storing multiple-bits in one cell is advanced and complicated technique and it tends to take a long time to perform processing. This conflicts with the requirement of high-speed operation even if large storage capacity of the memory device can be realized.

BRIEF DESCRIPTION OF THE DRAWINGS

FIG. 1 is a block diagram illustrating a part of a reference example of a memory device.

FIG. 3 illustrates main function blocks of a host and a memory card according to a first embodiment.

FIG. 4 illustrates the configuration of a memory space of a memory.

FIG. 6 schematically illustrates data transfer at one operation of the memory card according to the first embodiment.

FIG. 8 time-sequentially illustrates one operation by the memory card according to a second embodiment with steps each designated by a component that executes the corresponding step.

DETAILED DESCRIPTION

In general, according to one embodiment, a memory device includes a semiconductor memory and a controller that controls the semiconductor memory. The controller includes a first command issuing module, second command issuing module, error correction module and control module. The first command issuing module is configured to issue a read command to the semiconductor memory. The second command issuing module is configured to issue a first command instructing a process that does not involve reading data from the semiconductor memory independently from the first command issuing module to the semiconductor memory. The error correction module is configured to correct an error contained in data supplied from the semiconductor memory. The control module is configured to control the error correction module, first command issuing module and second command issuing module.

Figure 2:
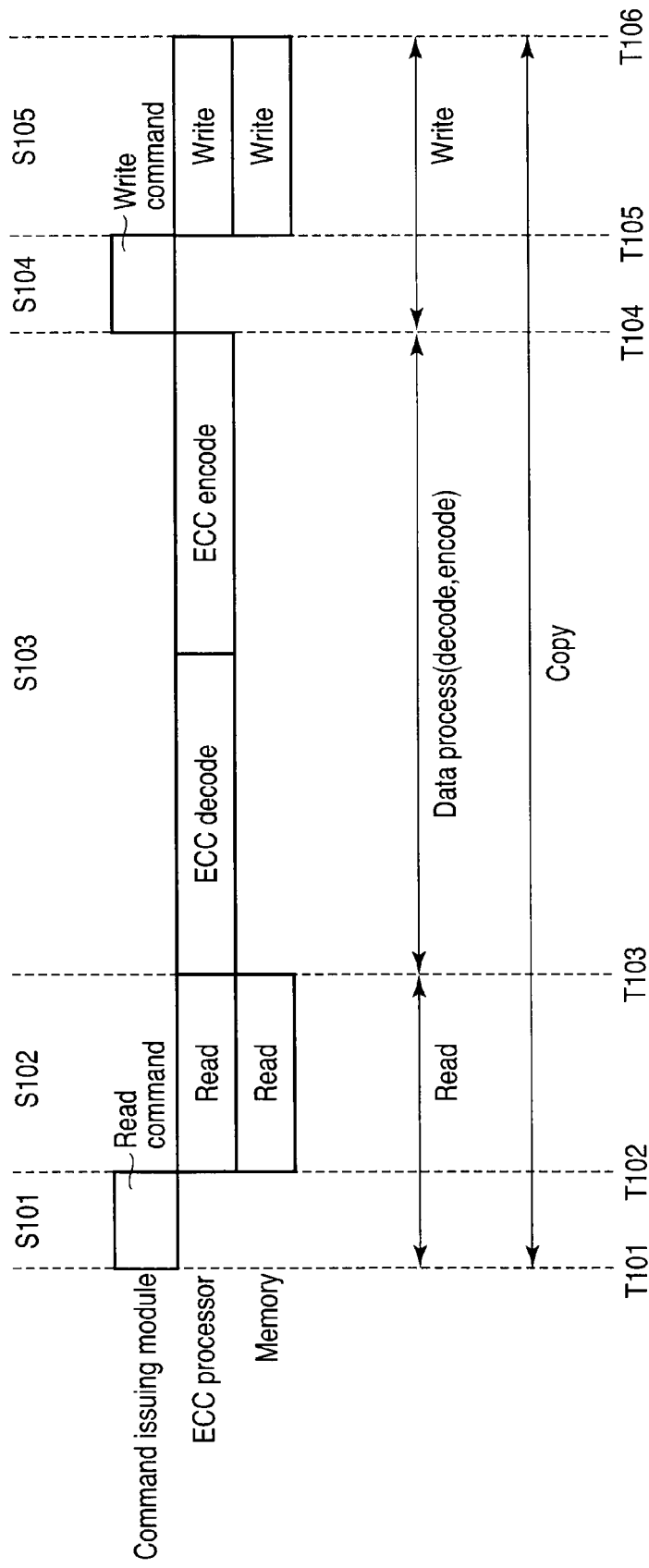
FIG. 2 illustrates copying in the memory device of FIG. 1.

Prior to the description of embodiments, a reference example is explained with reference to FIG. 1 and FIG. 2. FIG. 1 is a block diagram illustrating a part of a reference example of a memory device. FIG. 2 illustrates a command and data transmitted and received when data in the memory device is copied. As shown in FIG. 1, a memory device 101 includes a controller 102 and NAND flash memory 103. The controller 102 includes a system controller 111, command issuing module 112 and error correction code (ECC) processor 113. The system controller 111 controls the operation of the controller 102, and in the example of FIG. 1, it controls the command issuing module 112 and ECC processor 113.

The controller 102 performs the following operations as shown in FIG. 1 and FIG. 2 to copy data in a storage area of the flash memory 103 into another storage area. FIG. 2 time-sequentially illustrates copying data by the memory device of FIG. 1 with steps each designated by a component that executes the corresponding step.

First, the system controller 111 instructs the command issuing module 112 to issue a read command. The read command specifies an address of to-be-copied data. The command issuing module 112 supplies such a read command to the memory 103 (step S101, time T101).

When receiving the read command, the memory 103 outputs to-be-read data (step S102, time T102). The ECC processor 113 receives the output data. The ECC processor 113 includes a data temporary storage area and temporarily stores supplied data. Further, the ECC processor 113 subjects the stored data to predetermined data processing according to an instruction of the system controller 111 (step S103, time T103). Such data processing includes detecting and/or correcting one or more errors in the data. More specifically, the ECC processor 113 uses an ECC in the data to detect one or more errors in the data, and, if any, correct the detected error(s) (ECC decode). Then, the ECC processor 113 adds a new ECC to the error-corrected data (ECC encode).

After the ECC encode process is terminated, the system controller 111 receives notification indicative of the termination of the ECC encode process from the ECC processor 113. When receiving the notification, the system controller 111 instructs the command issuing module 112 to issue a write command, and the command issuing module 112 supplies a write command to the flash memory 103 (step S104, time T104). The system controller 111 instructs the ECC processor 113 to supply re-encoded data to the flash memory 103 (step S105, time T105). The flash memory 103 writes the supplied data to a specified storage area (copy destination storage area).

As can be understood from FIG. 2, the steps contained in copying are performed serially. That is, the operations are performed sequentially in the order of a read command supply operation, data read operation, data processing operation, write command supply operation and data write operation, and the steps are not overlapped. One of the reasons is to simplify the operation of the controller as far as possible and the design of the controller. That is, if the steps are performed serially without overlapping, the design of the controller is simpler than it would be where steps are permitted to be overlapped. Therefore, a program for controlling the system controller 111 is configured to cause it to serially perform the steps configuring copying without overlapping.

However, there occurs a phenomenon that the time required for processing data (step S103) increases. One of the reasons is related to improved performance of a flash memory to store multi-valued data, that is, one memory cell can store data of two or more bits. Realizing multiple-bit stored by one memory cell requires a particular memory cell to have selected one of four or more threshold values, and as a result, the control operation is complicated. Then, the technique for maintaining the data reliability is further complicated, and such a technique includes an error correction technique by use of an ECC. Therefore, with an increase in the error correction ability, time required for processing data as in step S103 increases.

As can be clearly understood from FIG. 2, the memory 103 performs no operation while the ECC processing is progressing. Therefore, maintaining the memory 103 in the ready state during the time for the ECC processing is inefficient from the viewpoint of use of the memory device 101. If such unproductive time can be taken advantage of, the memory card can be further effectively used.

Embodiments configured based on the above knowledge is now described with reference to the accompanying drawings. In the following description, components having substantially the same functions and configurations are denoted by the same symbols and the repetitive explanation thereof is made only when necessary.

Each function block can be implemented as hardware, computer software or a combination thereof. To clearly illustrate this interchangeability of hardware and software, each block is described in terms of the function thereof. Whether the function is implemented as hardware or software depends on the particular application or design constraints imposed on the overall system. Those skilled in the art can implement the described functions in varying ways for each particular application, but any implementation is included in the scope of the embodiments.

A case wherein a memory card, particularly, an SD™ card, is used as an example of the memory device according to embodiments is explained. However, various types of storage devices each of which includes a memory described below and a controller that controls the memory are included in the scope of the embodiments. Such a storage device includes, for example, a personal computer (PC) having a solid-state drive (SSD) or built-in memory device mounted therein, a portable electronic device and the like.

(First Embodiment)

The configuration of a memory card according to a first embodiment is described with reference to FIG. 3 to FIG. 6. FIG. 3 illustrates main function blocks of a host device 1 and memory card 2 according to the first embodiment. The host device (hereinafter simply referred to as a host) 1 includes software 11, file system 12, SD interface 13 and the like. The software 11, file system 12 and SD interface 13 may be implemented by means of a micro processing unit (MPU) and programs in a read-only memory (ROM) or random access memory (RAM).

The MPU controls the operation of the overall host 1. Firmware (control program, or instructions) stored in the ROM is read into the RAM when the power is supplied to the host 1. Then, the MPU performs predetermined processing according to the firmware (instructions). The software 11 and file system 12 are provided in the ROM or RAM, for example, and contain programs containing instructions used to cause the MPU to perform a predetermined process. The SD interface 13 is configured by hardware or software for allowing the host 1 to be interfaced with the memory card 2. The host 1 communicates with the memory card 2 via the SD interface 13. The SD interface 13 specifies various configurations required for causing the host 1 and memory card 2 to communicate with each other and has various sets of commands that can also be recognized by an SD interface 41 of the memory device 2, which will be described later. Further, the SD interface 13 includes the configuration (for example, the arrangement or the number of pins) of hardware that can be connected to the SD interface 31.

The memory device 2 includes a NAND flash memory (simply referred to as a memory hereinafter) 21 and a controller 22 that controls the memory 21. The memory device 2 receives the power when it is connected to the host 1 or when off-state host 1 with the device 2 inserted therein is turned on, performs the initialization and then performs processing corresponding to access from the host 1.

The memory 21 is configured by, for example, a NAND flash memory and nonvolatily stores data and writes and reads data in the unit called a page formed of a plurality of memory cells. A unique physical address is allocated to each page. Further, the memory 21 performs a data erase process in a unit called a physical block (erase block) formed of a plurality of pages.

The controller 22 manages the data storage state of the memory 21. The operation of managing the storage state includes managing the correspondence between each page (or physical block) of a physical address and a logical address of data stored in the page, and managing which physical address page (or physical block) is in the erased state (i.e., stores no or invalid data).

The controller 22 includes an SD interface 31, MPU 32, ROM 33, RAM 34 and NAND interface 35.

Like the SD interface 13, the SD interface 31 includes hardware and software for allowing the memory device 2 to be interfaced with the host 1, specifies configurations required for making communication between them and has various sets of commands. Further, the SD interface 31 contains the configuration (for example, the arrangement or the number of pins) of the hardware. The memory device 2 (controller 22) communicates with the host 1 via the SD interface 31.

The MPU 32 controls the operation of the overall memory device 2. When the memory device 2 is supplied with the power, firmware (control program, or instructions stored in the ROM 33) is read into the RAM 34. Then, the MPU 32 performs predetermined processing according to the firmware (instructions). The MPU 32 forms various tables in the RAM 34 according to a control program and performs predetermined processing with respect to the memory 21 according to a command received from the host 1.

The ROM 33 stores control programs and the like controlled by the MPU 32. The RAM 34 is used as a work area of the MPU 32 and temporarily stores the control programs and various tables. Such tables include a translation table of physical addresses of a page that stores data having a logical address assigned to the data by the file system 12 (logical-physical table). The NAND interface 35 allows the controller 22 to be interfaced with the memory 21.

FIG. 4 illustrates an example of the configuration of a memory space of the memory 21. As shown in FIG. 4, the memory 21 includes a normal memory area 41 and page buffer 42. The memory area 41 includes a plurality of physical blocks BLK. Each physical block BLK is configured by a plurality of pages PG. Each page PG is configured by an array of bits stored in serially connected memory cell transistors.

Each memory cell is configured by a metal oxide semiconductor field-effect transistor (MOSFET) constructed in a so-called stacked gate structure. The threshold voltage of each cell transistor varies according to the number of electrons captured in the floating gate and the cell transistor stores information corresponding to the threshold voltage.

The memory cell 21 can be formed to allow each cell transistor to take selected one of states that demonstrate four or more different threshold voltages, that is, to allow each cell transistor to store multiple values (multiple bits). One transistor can store two or more bits of data that.

The control gate electrodes of cell transistors belonging to the same row are connected to a corresponding one of the word lines. Select gate transistors are provided at both ends of the serially-connected cell transistors that belong to the same column. One of the select gate transistors is connected to a bit line. Writing or reading data is performed for each set of cell transistors connected to the same word line and a storage area composed of the set of cell transistors corresponds to one page. For example, each page PG has 2112 bytes and each block BLK has 128 pages. The erasing data is performed in a unit of each block BLK.

Figure 5:
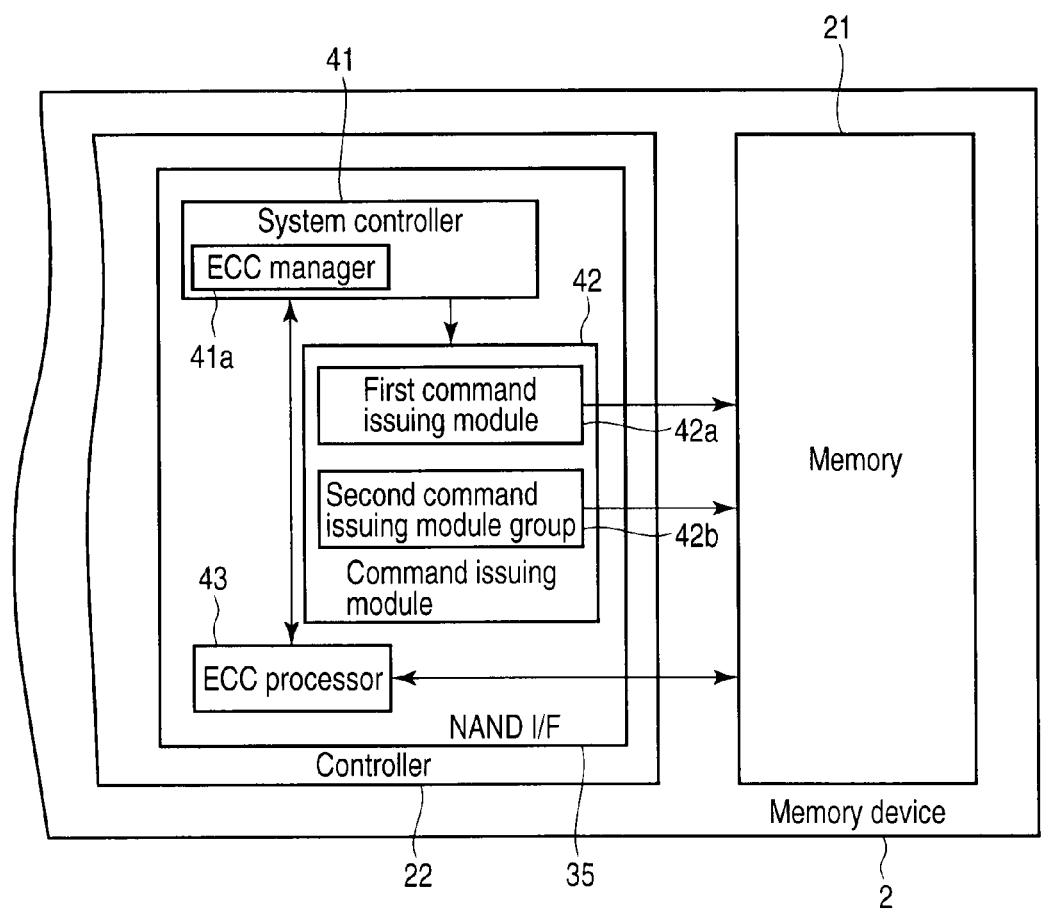
FIG. 5 is a block diagram illustrating the detail of a NAND interface.

The NAND interface 35 is now described with reference to FIG. 5. FIG. 5 is a block diagram illustrating the detail of the NAND interface 35. The NAND interface 35 includes a system controller 41, command issuing module 42 and ECC processor 43. As described above, each block can be implemented as hardware only, software only or a combination thereof. More specifically, each block is implemented by an MPU 32, ROM 33 and RAM 34 as hardware and is implemented by the operation of the MPU 32 controlled by a program in the ROM 33 and/or RAM 34.

The system controller 41 controls the operation of the NAND interface 35. The command issuing module 42 supplies various commands that can be recognized by the memory 21 according to an instruction of the system controller 41. For example, the commands are stored in the ROM 33 and include a general write command, read command, erase command, copy command and the like. The system controller 41 includes an ECC manager 41a. The ECC manager 41a manages the operation of the ECC processor 43.

The command issuing module 42 includes a first command issuing module 42a and second command issuing module group 42b. The second command issuing module group includes one or more second command issuing modules. The first command issuing module 42a and second command issuing module group 42b are configured to be mutually independent and issue commands according to an instruction of the system controller 41 without being restricted by each other. The first command issuing module 42a and second command issuing module group 42b can issue various commands that can be executed by the command issuing module 42. Further, the second command issuing modules 42b are configured to be mutually independent and issue commands according to an instruction of the system controller 41 without being restricted by each other. The second command issuing modules in the second command issuing module group 42b have the same features. Therefore, the following description simply uses the term of "second command issuing module 42b" and reference to it means "a given second command issuing module in the second command issuing module group".

The ECC processor 43 temporarily stores supplied data according to an instruction of the system controller 41 and subjects the stored data to predetermined processing. Such data processing includes using an ECC to detect one or more errors in the data, and, if any, correct the detected error(s) (ECC decode), and adding a new ECC to the error-corrected data.

Figure 7:
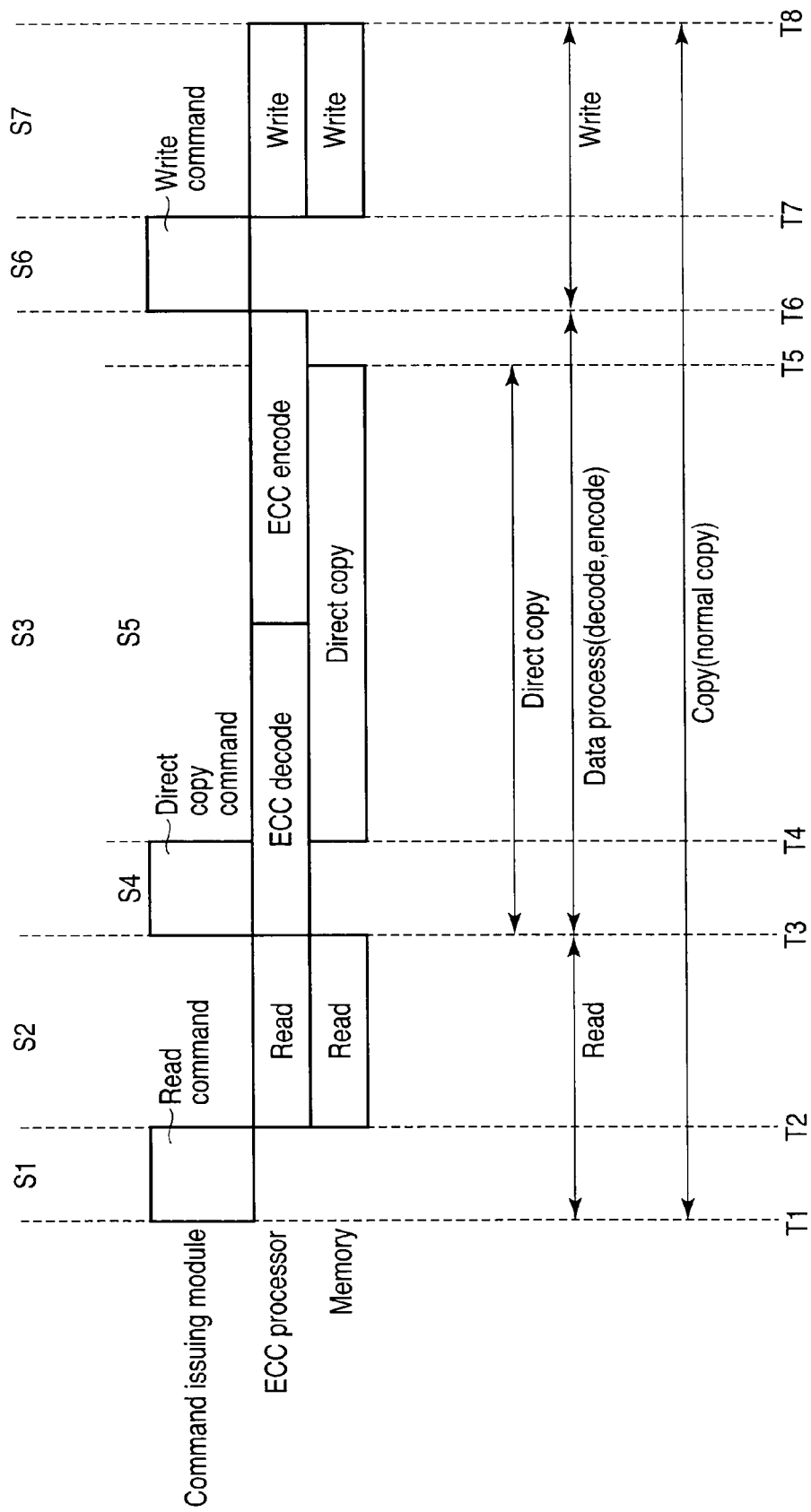
FIG. 7 time-sequentially illustrates one operation by the memory card according to the first embodiment with steps each designated by a component that executes the corresponding step.

The operation of the memory device according to the first embodiment is now described with reference to FIG. 6 and FIG. 7. FIG. 6 schematically illustrates data transfer at one operation of the memory card according to the first embodiment. FIG. 7 time-sequentially illustrates one operation by the memory card according to the first embodiment with steps each designated by a component that executes the corresponding step.

The memory device 2 is configured to perform at least two types of copying. One of the copying includes reading data from the memory 21 to the controller 22, processing data within the controller 22 and writing data from the controller 22 to the memory 21. This copying is controlled by the system controller 41 and is simply referred to as a copying or normal copying to be distinguished from another copying that will be described later.

The normal copying is performed, for example, to copy data in a cell transistor that stores multiple-bit data to another cell transistor that stores single-bit data. In order to realize storage of multiple-bit data, it is necessary to hold a selected one of four or more threshold values in the memory cell and, which results in complicated control operation. Since the control operation includes an advanced control operation, it is preferable to perform an error correction to read multiple-bit data to maintain the high reliability of data. Therefore, the normal copying includes an error correction using an ECC. Some storage devices basically have to perform an error correction to read multiple-bit data (including data read for copying). The normal copying may be used, for example, to perform a so-called copy-involving data writing, which is necessary because overwriting cannot be performed to the NAND flash memory. The copy-involving data writing involves, in response to a request to rewrite only a part of the data stored in a particular block, writing to-be-rewritten new data into a erased new block and not-to-be-rewritten data in the old block containing the old data (data replaced by the new data) is copied into a new block.

The second copying includes copying data stored in a page (or a block) in the memory 21 to another page (or a block). The second copying is supported by the memory 21 and can be triggered by a command issued from the command issuing module 42. The second copying is referred to as a direct copying and a command that instructs execution of the direct copying is referred to as a direct copy command for convenience.

The direct copying is performed, for example, to copy data in a plurality of cell transistors each storing single-bit data to one cell transistor as multiple-bit data. Since single-bit data can be written and read with higher reliability than multiple-bit data, high reliability can be maintained even if the copying is performed without performing an error correction. In order to write multiple-bit data, some storage devices that allows for writing multiple-bit data may need to first write data as single-bit data and then copy the single-bit data as multiple-bit data. In such a case, the direct copy command may be used.

As shown in FIG. 6 and FIG. 7, the memory device 2 performs the normal copying in a period of time T1 to time T8. More specifically, the memory device 2 is assumed to copy data in block BLK3 to another block BLK0. According to the described example, each cell transistor in block BLK3 stores multiple-bit data and each cell transistor in the block BLK0 is to store single-bit data. In order to perform the normal copying, the system controller 41 instructs the first command issuing module 42a to issue a read command. The read command specifies an address of to-be-copied data. The first command issuing module 42a supplies such a read command to the memory 21 (step S1, time T1). In the present context, the to-be-copied data may be multiple-bit data stored in one cell transistor.

When receiving a read command, the memory 21 outputs to-be-read data (step S2, time T2). The output data is received by the ECC processor 43 and transmitting to-be-copied data from the memory 21 to the ECC processor 43 is terminated at time T3.

When transmitting to-be-copied data is terminated, the ECC processor 43 starts predetermined data processing to data held in the ECC processor 43 (step S3, time T3). The data processing includes detecting and/or correcting one or more errors contained in data. More specifically, for example, the ECC processor 43 uses an ECC contained in data to detect one or more errors in the data, and, if any, correct the detected error(s) (ECC decode). The ECC processor 43 adds a new ECC to the error-coded data (ECC encode). The data processing progresses until time T6.

When transmission of to-be-copied data is terminated at time T3, the ECC manager 41a recognizes termination of transmitting data from notification received from the ECC processor 43. At this time, the memory 21 enters the ready state and the ECC processor 43 takes charge of performing a series of processes required for the normal copying after time T3. For this reason, the memory 21 can perform a process that does not involve data output to the ECC processor 43 that is processing data. Therefore, the system controller 41 performs a direct copying in parallel with the data processing in the ECC processor 43. To this end, the system controller 41 instructs the second command issuing module 42b to issue a direct copy command (step S4). The direct copy command specifies an address of to-be-copied data and an address of a new storage destination of the to-be-copied data. Thus, the command issuing module 42 is configured to be operated in parallel with the operation of the ECC processor 43. Further, the system controller 41 is configured to manage and control the normal copying in parallel with another process that dose not involve reading data from the memory 21 such as the direct copying while the normal copying is progressing. That is, a program (firmware) that controls the system controller 41 is configured so that the above-described parallel process can be performed. Since the command issuing module 42 includes the two command issuing modules 42a and 42b, a command that instructs another process via the command issuing module 42b can be issued before a process (for example, normal copying) that involves the other command issuing module 42a is completed. In other words, while the ECC processor 43 is performing the process involving the command issuing module 42a, the command issuing module 42b can be operated.

When receiving a direct copy command, the memory 21 performs direct copying (step S5, time T4). More specifically, the memory 21 temporarily stores data from a specified storage area (for example, block BLK1) to a built-in buffer and writes the stored data to another storage area (for example, block BLK2). The copying may include, for example, writing single-bit data per each cell transistor as multiple-bit data per each cell transistor. The direct copying is terminated at time T5. Thus, the memory 21 and ECC processor 43 operate in parallel in a period of time T4 to time T5.

Then, the data processing by the ECC processor 43 is completed (time T6). When the data processing is completed, the system controller 41 recognizes the end of the data processing from notification or the like received from the ECC processor 43. Then, the system controller 41 instructs the command issuing module 42 to issue a write command and the command issuing module 42 issues a write command (step S6, time T6). Issuance of the write command can be performed by any of the first issuing module 42a and second command issuing module group 42b. For example, the first issuing module 42a may be designed to take charge of issuing a series of commands for the whole normal copying to allow the first issuing module 42a to issue the write command being discussed.

Next, the system controller 41 instructs the ECC processor 43 to supply re-encoded data to the memory 21. The ECC processor 43 supplies the re-encoded data to the memory 21. Then, the memory 21 writes the supplied data to a specified storage area (for example, block BLK0) (step S7, time T7).

Thus, the first issuing module 42a particularly plays a role of issuing a command involving reading data from the memory 21. Further, the second command issuing module 42b particularly plays a role of issuing a command that does not involve reading data from the memory 21. Since a plurality of processes of reading data from the memory 21 cannot be simultaneously performed, providing only one first issuing module 42a is sufficient. In contrast, the memory 21 may be able to simultaneously perform a plurality of processes that do not involve output of data from the memory 21 during processing by the ECC processor 43. Therefore, a plurality of second command issuing modules 42b are provided, which allows for simultaneous performing of a plurality of processes that do not involve output of data from the memory 21.

Further, the memory device 2 can, of course, perform control that forbids executing of a process in parallel with another process that involves data processing as in the conventional case. The controller 22 may be configured to selectively set a mode that forbids the parallel process and another mode that permits a parallel process (as in FIG. 6, FIG. 7) according to the operation of the controller 22.

As described above, according to the storage device of the first embodiment, the system controller 41 and command issuing module 42 are configured to perform a process by the ECC processor 43 in parallel with another process such as a direct copying that does not involve reading data from the memory 21. Therefore, a process that does not involve reading data from the memory 21 can be performed while the ECC processor 43 is processing data after starting the normal copying that involves processing by the ECC processor 43. As a result, a storage device capable of high-speed operation can be realized by effectively utilizing time required for the process by the ECC processor 43 and performing a process that dose not involve reading data from the memory 21. As a more specific example, a storage device capable of high-speed operation can be realized by performing a direct copying during a process by the ECC processor involved in the normal copying. The advantage is particularly effective in a case where, for example, the system controller does not immediately perform instructions from the host, stores the instructions in a buffer or the like and collectively executes the instructions later.

(Second Embodiment)

In the first embodiment, the direct copying is illustrated as the process that can be performed in parallel with the normal copying. However, another process that does not involve reading data such as erasing data can be performed.

FIG. 8 time-sequentially illustrates one operation by a memory device according to a second embodiment with steps each designated by a component that executes the corresponding step. The second embodiment of FIG. 8 differs from the first embodiment (FIG. 7) only in replacement of the direct copy command and direct copying by an erase command and erase operation, respectively. The other configuration and features are entirely the same as those of the first embodiment.

As shown in FIG. 8, when transmitting to-be-read data is terminated at time T3, an ECC manager 41a recognizes the end of data transmitting from notification or the like received from an ECC processor 43. At this time, a memory 21 enters a ready state and the ECC processor 43 takes charge of performing a series of processes required for the normal copying after time T3. For this reason, the memory 21 can perform a process that does not involve data output to the ECC processor 43 that is processing data. Therefore, a system controller 41 instructs a second command issuing module group 42b to issue an erase command at time T3 (step S11). When receiving the erase command, the memory 21 erases designated data in a period from time T4 to time T5 (step S12).

Like the first embodiment, in the second embodiment, the system controller 41 and command issuing module 42 are configured to perform a normal copying in parallel with another process that does not involve reading data from the memory 21 such as erasing data. Therefore, the same advantages as those of the first embodiment can be realized.

(Third Embodiment)

The first embodiment relates to an example in which first-initiated one of the two processes is the normal copying that involves reading data from the memory 21 and writing data to the memory 21. On the other hand, a third embodiment relates to an example in which first-initiated one of the two processes is only reading data from the memory 21.

Figure 9:
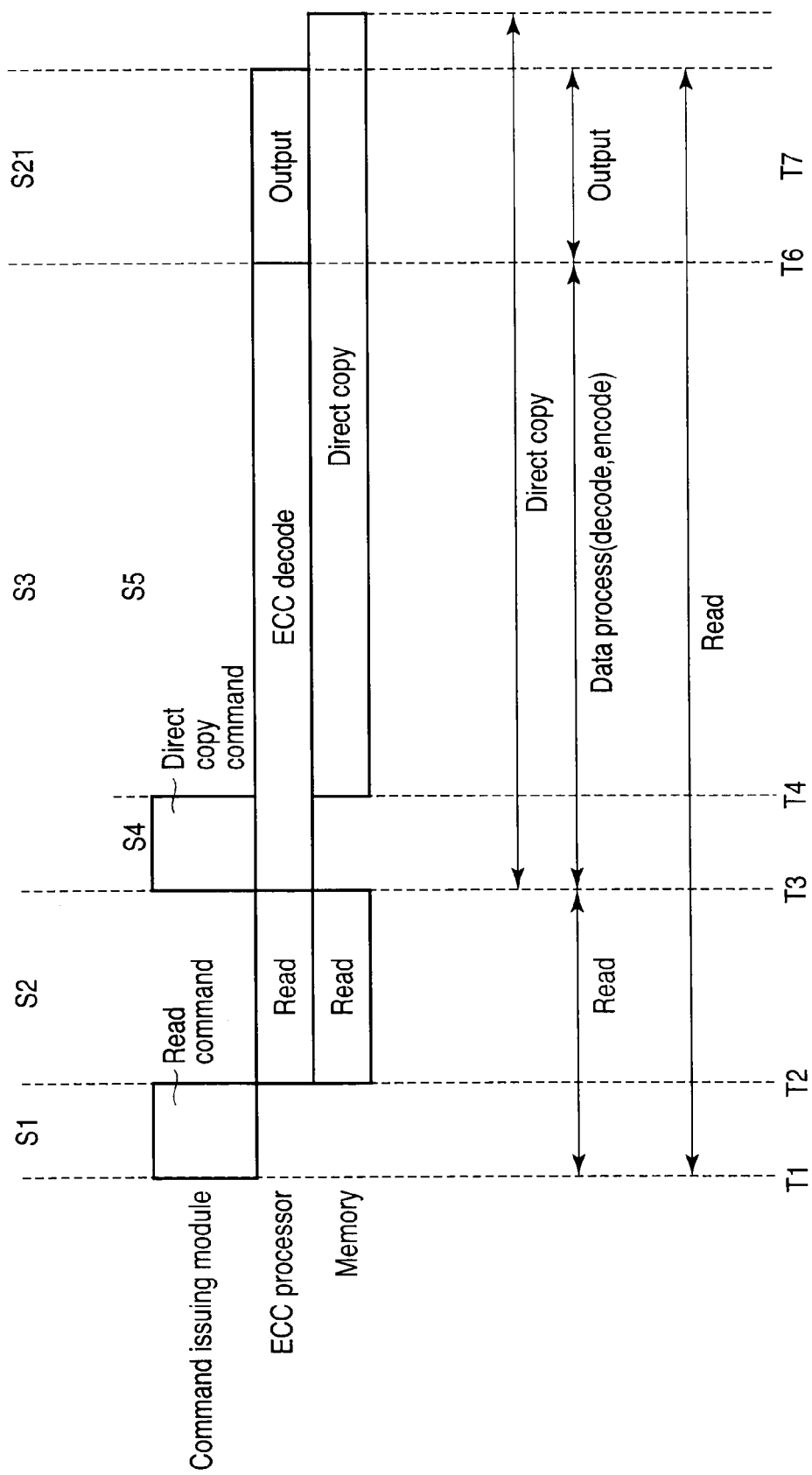
FIG. 9 time-sequentially illustrates one operation by the memory card according to a third embodiment with steps each designated by a component that executes the corresponding step.

FIG. 9 time-sequentially illustrates one operation by a memory device according to the third embodiment with steps each designated by a component that executes the corresponding step. The third embodiment of FIG. 9 is different from the first embodiment (FIG. 7) in that outputting data is performed instead of writing data of steps S6, S7. The other configuration and features are entirely the same as those of the first embodiment.

As shown in FIG. 9, when transmitting to-be-read data is terminated at time T3, an ECC manager 41a recognizes the end of data transmitting from notification or the like received from an ECC processor 43. At this time, a memory 21 enters a ready state and the ECC processor 43 takes charge of performing a series of processes required for the normal copying after time T3. Therefore, the memory 21 can perform a process that does not involve data output to the ECC processor 43 that is processing data. Therefore, a system controller 41 issues, for example, a direct copy command as in the first embodiment or an erase command as in the second embodiment at time T3. The memory 21 performs the direct copying or erases designated data in a period from time T4 to time T5.

When the data processing by the ECC processor 43 is terminated at time T6, the ECC processor 43 outputs data according to an instruction from the system controller 41 (step S21). The output data is supplied to a host 1 via an SD interface 31.

Like the first embodiment, in the third embodiment, the system controller 41 and command issuing module 42 are configured to perform a normal copying in parallel with another process that does not involve reading data from the memory 21 such as erasing data. Therefore, the same advantage as those of the first embodiment can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
a semiconductor memory; and
a controller that controls the semiconductor memory, the controller including a first command issuing module, a second command issuing module, an error correction module and a control module, the first command issuing module being configured to issue a read command to the semiconductor memory, the second command issuing module being configured to issue a first command independently from the first command issuing module to the semiconductor memory, the first command instructing a process that does not involve reading data from the semiconductor memory, the error correction module being configured to correct an error contained in data which is supplied from the semiconductor memory in response to the read command, the control module being configured to control the error correction module, the first command issuing module and the second command issuing module, and the second command issuing module being configured to issue a command while the error correction module is performing a process for correcting an error.

2. The device of claim 1, wherein the second command issuing module is configured to issue the first command after the process in the error correction module is started after issuance of the read command.

3. The device of claim 2, wherein the control module is configured to cause one of the first command issuing module and the second command issuing module to issue a write command used to write data from the error correction module into the semiconductor memory after termination of the process in the error correction module.

4. The device of claim 3, wherein issuing the read command and the write command configures a part copying data in the semiconductor memory.

5. The device of claim 4, wherein copying data in the semiconductor memory is performed without outputting the data from the semiconductor memory to an exterior of the memory device.

6. The device of claim 5, wherein:
the semiconductor memory includes memory cells and is configured to read and write data of at least one bit from and to at least one of the memory cells;
the read command instructs reading data from a memory cell of the memory cells that stores data of at least two bits; and
the write command instructs writing data of one bit to one of the memory cells.

7. The device of claim 6, wherein:
the error correction module receives data read from one of the memory cells that stores data of at least two bits and corrects an error contained in the received data, and;
the write command instructs writing the error-corrected data to at least one of the memory cells as single-bit data.

8. The device of claim 6, wherein the first command instructs copying data within the semiconductor memory without reading the data to an exterior of the semiconductor memory.

9. The device of claim 8, wherein the command that instructs copying data within the semiconductor memory without reading the data to the exterior of the semiconductor memory instructs reading data from one of the memory cells that stores single-bit data and writing the read data into at least one of the memory cells as data of at least two bits.

10. The device of claim 6, wherein the first command instructs erasing data in the semiconductor memory.

11. The device of claim 2, wherein the error correction module receives data read from at least one of the memory cells, corrects an error contained in the received data and outputs the error-corrected data to an exterior of the memory device.

12. The device of claim 11, wherein the first command instructs copying data within the semiconductor memory without reading the data to an exterior of the semiconductor memory.

13. The device of claim 11, wherein the first command instructs erasing data in the semiconductor memory.

14. The device of claim 1, further comprising a third command issuing module configured to issue a second command that instructs a process that does not involve reading data from the semiconductor memory independently from the first command issuing module to the semiconductor memory, wherein the second and third command issuing modules are configured to independently issue commands.

15. The device of claim 1, wherein the controller has a first mode that permits the second command issuing module to issue a command while the error correction module is correcting an error in data and a second mode that forbids the second command issuing module from issuing a command while the error correction module is correcting an error in data.

* * * * *